United States Patent
Lee et al.

(10) Patent No.: US 8,422,200 B2
(45) Date of Patent: Apr. 16, 2013

(54) CONDUCTIVE STRUCTURE HAVING AN EMBEDDED ELECTRODE, AND SOLID CAPACITOR HAVING AN EMBEDDED ELECTRODE AND METHOD OF MAKING THE SAME

(75) Inventors: Wei-Chih Lee, New Taipei (TW); Ming-Tsung Chen, Hsinchu (TW)

(73) Assignees: Inpaq Technology Co., Ltd., Miaoli County (TW); Apaq Technology Co., Ltd., Miaoli County (TW)

( * ) Notice: Subject to any disclaimer, the term of this patent is extended or adjusted under 35 U.S.C. 154(b) by 154 days.

(21) Appl. No.: 13/115,964

(22) Filed: May 25, 2011

(65) Prior Publication Data

US 2012/0300369 A1    Nov. 29, 2012

(51) Int. Cl.
  *H01G 9/00*    (2006.01)
(52) U.S. Cl.
  USPC ........... 361/523; 361/516; 361/519; 361/525; 361/528; 361/529
(58) Field of Classification Search .................. 361/523, 361/516, 517, 519, 525, 528, 529, 530, 540–541; 29/25.01, 25.03
  See application file for complete search history.

(56) References Cited

U.S. PATENT DOCUMENTS

| 6,206,937 | B1 * | 3/2001 | Kudoh et al. | 29/25.03 |
| 6,793,690 | B2 * | 9/2004 | Kudoh et al. | 29/25.03 |
| 6,853,540 | B2 * | 2/2005 | Kudoh et al. | 361/523 |
| 7,054,141 | B2 * | 5/2006 | Sakaguchi et al. | 361/523 |
| 7,511,944 | B2 * | 3/2009 | Kuriyama | 361/535 |
| 8,116,062 | B2 * | 2/2012 | Oh | 361/303 |

* cited by examiner

*Primary Examiner* — Nguyen T Ha
(74) *Attorney, Agent, or Firm* — Li&Cai Intellectual Property (USA) Office (57) ABSTRACT

A solid capacitor having an embedded electrode includes a substrate unit, a first conductive unit, a second conductive unit, a first insulative unit, a third conductive unit, a second insulative unit, and an end electrode unit. The substrate unit includes a substrate body and a conductive body embedded into the substrate body. The substrate body has a lateral opening and a plurality of top openings, and the conductive body has a lateral conductive area exposed from the lateral opening and a plurality of top conductive areas respectively exposed from the top openings. The first conductive unit includes a plurality of first conductive layers respectively covering the top conductive areas. The second conductive unit includes a second conductive layer covering the first conductive layers. The porosity rate of the second conductive layer is larger than that of each first conductive layer.

16 Claims, 7 Drawing Sheets

CONDUCTIVE STRUCTURE HAVING AN EMBEDDED ELECTRODE, AND SOLID CAPACITOR HAVING AN EMBEDDED ELECTRODE AND METHOD OF MAKING THE SAME

BACKGROUND OF THE INVENTION

1. Field of the Invention

The instant disclosure relates to a conductive structure, and a solid capacitor and a method of making the same, and more particularly, to a conductive structure having an embedded electrode, and a solid capacitor having an embedded electrode and a method of making the same.

2. Description of Related Art

An already known solid electrolytic capacitor has a configuration constituted by an anode, a dielectric layer, an electrolyte layer and a cathode, and is generally obtained by forming, on a metal having a valve action (valve-action metal) and constituting an anode, an oxide film as a dielectric layer (hereinafter called a dielectric layer), then forming thereon a solid electrolyte layer as a semiconductor layer and further forming a cathode member of, for example, graphite. The valve-action metal is a metal capable of forming an oxide film of a controllable thickness by anodizing, and can be Nb, Al, Ta, Ti, Hf, Zr etc., among which Al and Ta are principally utilized for the practical purposes. Of these, Al is employed as the anode in a form of an etched foil, while Ta is employed as the anode in a form of a porous material formed by powder sintering. An electrolytic capacitor of the porous sintered type can be with a particularly small size and a large capacity relative to other solid electrolyte capacitors, and is in strong demand as a component capable of enabling reduction in size of a mobile telephone a portable information terminal equipment etc.

For example, a known solid electrolytic capacitor utilizing Ta is obtained by forming a dielectric layer on a surface of an anode member formed by sintering a powder mixture in which a lead wire is embedded, and then forming, on the aforementioned dielectric layer, a conductive polymer layer, containing for example carbon powder, as a solid electrolyte layer. On the electrolyte layer formed as a semiconductor layer, a graphite paste layer and an Ag paste layer are formed which function as a cathode. Then lead frames are connected respectively to the lead wire of the anode member and the Ag paste layer, and the entire structure is resin molded so as to expose these lead frames. In such a known solid electrolytic capacitor, the electrolyte layer includes many cavities, into which conductive particles constituting the cathode member formed on the electrolyte layer penetrate. Such a phenomenon, when present extensively, provides an advantage of lowering an equivalent serial resistance (ESR) of the solid electrolytic capacitor itself, and also provides an advantageous effect of securing a capacitance even at a high frequency. However, the ESR of the known solid electrolytic capacitor is increased due to the usage of the lead frames.

SUMMARY OF THE INVENTION

One particular aspect of the instant disclosure is to provide a conductive structure having an embedded electrode, and a solid capacitor having an embedded electrode and a method of making the same.

One of the embodiments of the instant disclosure provides a solid capacitor having an embedded electrode, comprising: a substrate unit, a first conductive unit, a second conductive unit, a first insulative unit, a third conductive unit, a second insulative unit, and an end electrode unit. The substrate unit includes at least one substrate body and a conductive body embedded into the at least one substrate body, wherein the at least one substrate body has at least one lateral opening and a plurality of top openings, and the conductive body has at least one lateral conductive area exposed from the at least one lateral opening and a plurality of top conductive areas respectively exposed from the top openings. The first conductive unit includes a plurality of first conductive layers separated from each other and formed on the at least one substrate body to respectively cover the top conductive areas. The second conductive unit includes at least one second conductive layer formed on the at least one substrate body to cover the first conductive layers, wherein the at least one second conductive layer has a porosity rate larger than that of each first conductive layer. The first insulative unit includes at least one first insulative layer covering the outer surface of the at least one second conductive layer. The third conductive unit includes at least one third conductive layer covering the at least one first insulative layer. The second insulative unit includes at least one second insulative layer covering one part of the outer surface of the at least one third conductive layer, wherein the substrate unit, the first conductive unit, the second conductive unit, the first insulative unit, the third conductive unit, and the second insulative unit are combined to form a core unit. The end electrode unit includes at least two end electrode conductive bodies respectively covering two opposite end portions of the core unit, wherein one of the at least two end electrode conductive bodies contacts the at least one lateral conductive area, and the other end electrode conductive body contacts the other part of the outer surface of the at least one third conductive layer.

Furthermore, the at least one substrate body may be a ceramic substrate, the conductive body may be a tantalum body or a positive electrode body having a conductivity larger than that of the tantalum body, the at least one first insulative layer may be a $Ta_2O_5$ metal oxide layer, and the at least one second insulative layer may be an insulative polymer layer. Each first conductive layer and the at least one second conductive layer are sintered Ta conductive bodies, and the at least one third conductive layer may be a negative electrode body. The at least one third conductive layer may be a conductive polymer layer, and the conductive polymer layer includes a conductive carbon glue layer or a conductive silver glue layer formed on the outer surface thereof. The top conductive areas are arranged to form a predetermined shape, and each first conductive layer has a porosity rate between 0.1% and 5%.

One of the embodiments of the instant disclosure provides a method of manufacturing a solid capacitor having an embedded electrode, comprising the steps of: providing a substrate unit including at least one substrate body and a conductive body embedded into the at least one substrate body, wherein the at least one substrate body has at least one lateral opening and a plurality of top openings, and the conductive body has at least one lateral conductive area exposed from the at least one lateral opening and a plurality of top conductive areas respectively exposed from the top openings; forming a plurality of first conductive layers on the at least one substrate body to respectively cover the top conductive areas; forming at least one second conductive layer on the at least one substrate body to cover the first conductive layers, wherein the at least one second conductive layer has a porosity rate larger than that of each first conductive layer; forming at least one first insulative layer to cover the outer surface of the at least one second conductive layer; forming at least one third conductive layer to cover the at least one first insulative layer; forming at least one second insulative layer to cover one part of the outer surface of the at least one third conductive layer, wherein the at least one substrate body, the at least one first conductive layer, the at least one second conductive layer, the at least one first insulative layer, the at least one third conductive layer, and the at least one second insulative layer are combined to form a core unit; and forming at least two end electrode conductive bodies to respectively cover two opposite end portions of the core unit, wherein one of the at least two end electrode conductive bodies contacts the at least one lateral conductive area, and the other end electrode conductive body contacts the other part of the outer surface of the at least one third conductive layer.

One of the embodiments of the instant disclosure provides a conductive structure having an embedded electrode, comprising: a substrate unit, a first conductive unit, and a second conductive unit. The substrate unit includes at least one substrate body and a conductive body embedded into the at least one substrate body, wherein the at least one substrate body has at least one lateral opening and a plurality of top openings, and the conductive body has at least one lateral conductive area exposed from the at least one lateral opening and a plurality of top conductive areas respectively exposed from the top openings. The first conductive unit includes a plurality of first conductive layers separated from each other and formed on the at least one substrate body to respectively cover the top conductive areas. The second conductive unit includes a plurality of second conductive layers separated from each other and formed on the at least one substrate body to respectively cover the first conductive layers, wherein each second conductive layer has a porosity rate larger than that of each first conductive layer.

Therefore, the conductive body is embedded into the substrate body to form an embedded electrode, thus (1) the high resistance electrode path of the instant disclosure can be reduced to decrease the ESR (Equivalent Series Resistance), (2) the productivity and the production yield of the instant disclosure can be increased due to the separation of the positive electrode from the negative electrode during the manufacturing process, and (3) the instant disclosure can provide the solid capacitor having a single positive electrode or a plurality of positive electrodes according to different requirements.

To further understand the techniques, means and effects the instant disclosure takes for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention that they be used for limiting the instant disclosure.

DETAILED DESCRIPTION OF THE PREFERRED EMBODIMENTS

First Embodiment

Figure 1:
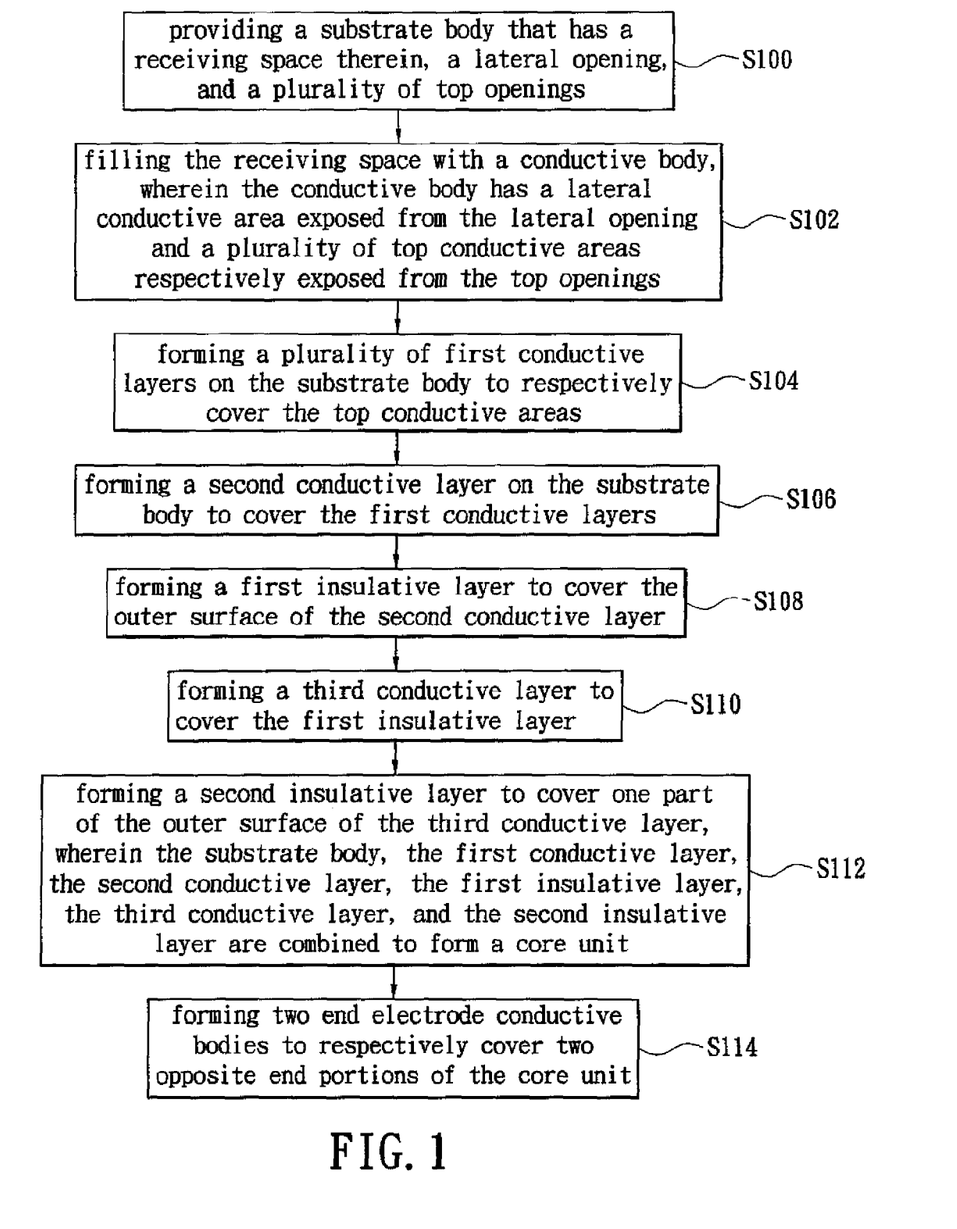
FIG. 1 shows a flowchart of the method of manufacturing a solid capacitor having an embedded electrode according to the first embodiment of the instant disclosure.
Figure 1A:
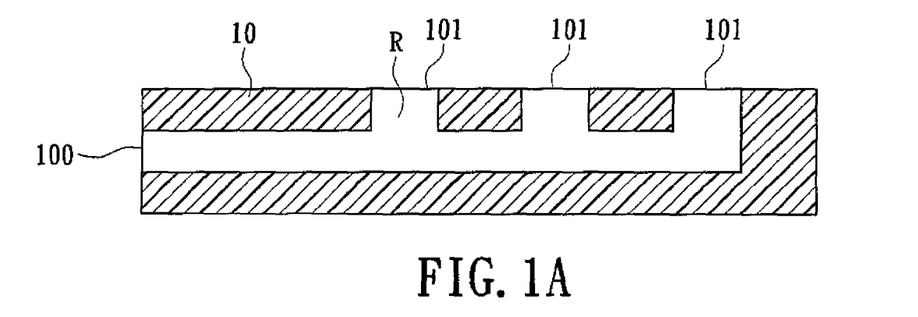
FIGS. 1A to 1H are cross-sectional views of the solid capacitor having an embedded electrode according to the first embodiment of the present invention, at different stages of the manufacturing processes, respectively.

Referring to FIGS. 1, and 1A to 1H, where the first embodiment of the instant disclosure provides a method of manufacturing a solid capacitor having an embedded electrode, comprising the steps of:

The step S100 is that: cooperating FIG. 1 with FIG. 1A, providing at least one substrate body 10, wherein the at least one substrate body 10 has a receiving space R formed therein, and the at least one substrate body 10 has at least one lateral opening 100 and a plurality of top openings 101. For example, the at least one substrate body 10 may be an $Al_2O_3$ ceramic substrate or any type of insulative substrate.

Figure 1B:
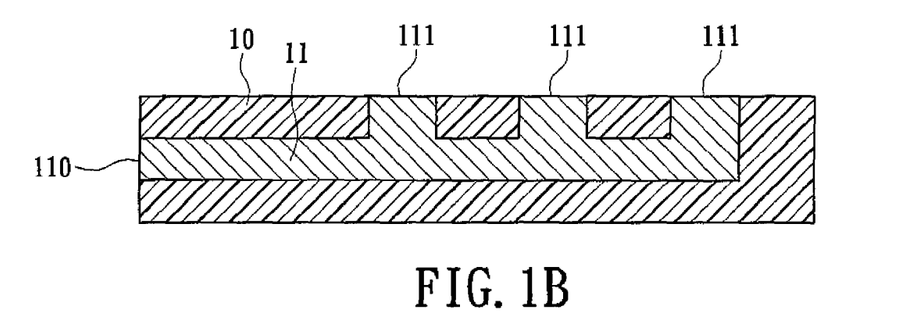

The step S102 is that: cooperating FIG. 1 with FIG. 1A to FIG. 1B, filling the receiving space R with a conductive body 11 to embed the conductive body 11 into the at least one substrate body 10, wherein the conductive body 11 has at least one lateral conductive area 110 exposed from the at least one lateral opening 100 and a plurality of top conductive areas 111 respectively exposed from the top openings 101. For example, the conductive body 11 may be a tantalum body or a positive electrode body (such as wolfram, rhodium, aluminum, etc.), and the conductivity of the positive electrode body is larger than that of the tantalum body. The positive electrode body is a positive electrode (+) of the solid capacitor. In addition, the top conductive areas 111 can be arranged to form a predetermined shape according to different requirements.

Figure 1C:
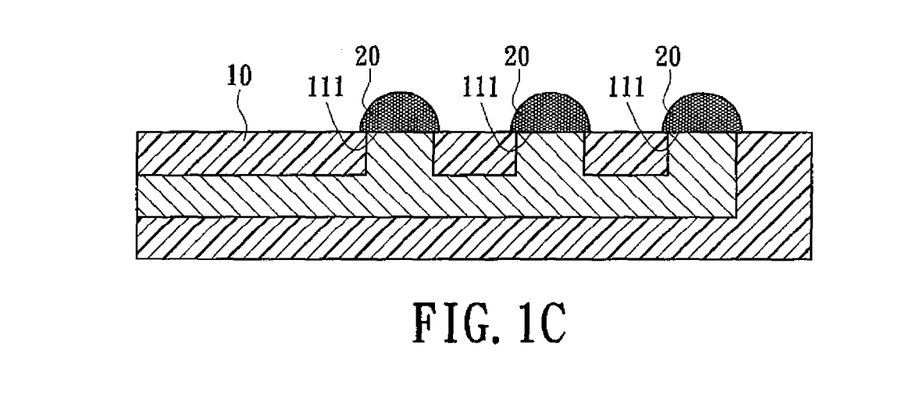

The step S104 is that: cooperating FIG. 1 with FIG. 1C, forming a plurality of first conductive layers 20 on the at least one substrate body 10 to respectively cover the top conductive areas 111. For example, each first conductive layer 20 may be a sintered tantalum (Ta) conductive body made of Ta metal powders by sintering, a sintered niobium (Nb) conductive body made of Nb metal powders by sintering, a sintered aluminum (Al) conductive body made of Al metal powders by sintering, or any type of sintered conductive body etc.

Figure 1D:
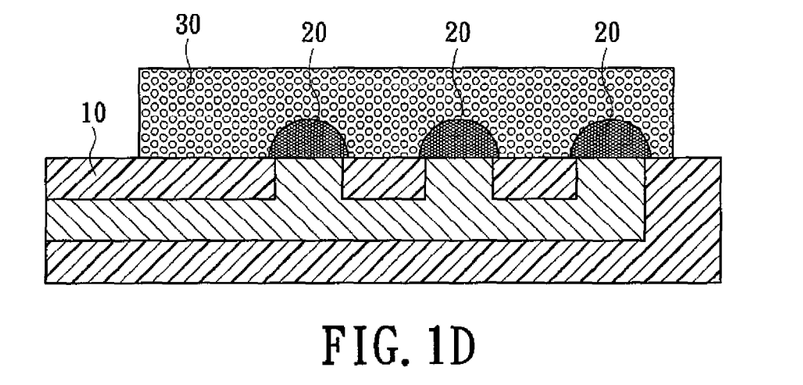

The step S106 is that: cooperating FIG. 1 with FIG. 1D, forming at least one second conductive layer 30 on the at least one substrate body 10 to cover the first conductive layers 20, wherein the at least one second conductive layer 30 has a porosity rate larger than that of each first conductive layer 20. For example, the at least one second conductive layer 30 may be a sintered tantalum (Ta) conductive body made of Ta metal powders by sintering, a sintered niobium (Nb) conductive body made of Nb metal powders by sintering, a sintered aluminum (Al) conductive body made of Al metal powders by sintering, or any type of sintered conductive body etc. In addition, each first conductive layer 20 has a porosity rate less than 5%. In other words, the density of each first conductive layer 20 is larger than that of the second conductive layer 30, thus the first conductive layers 20 with large density can provide good anti-seep property.

Figure 1E:
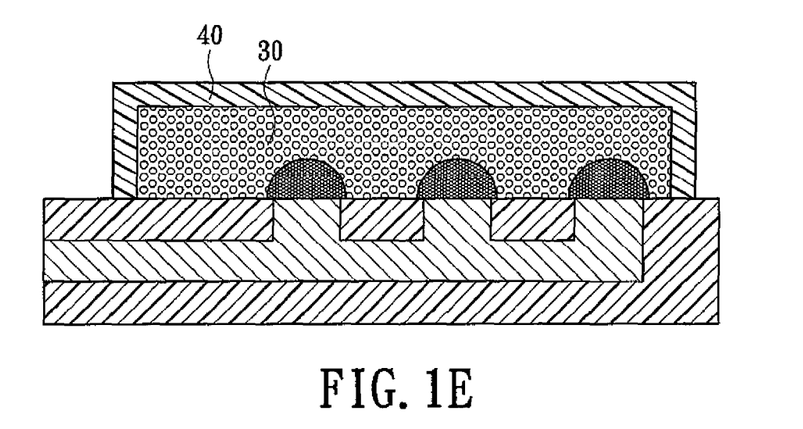

The step S108 is that: cooperating FIG. 1 with FIG. 1E, forming at least one first insulative layer 40 to cover the outer surface of the at least one second conductive layer 30. For example, if the at least one second conductive layer 30 is a sintered tantalum (Ta) conductive body made of Ta metal powders by sintering, the at least one first insulative layer 40 is a $Ta_2O_5$ metal oxide layer.

Figure 1F:
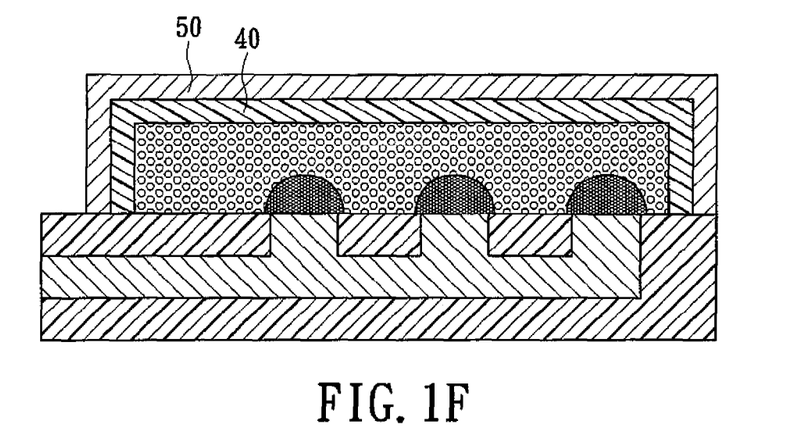

The step S110 is that: cooperating FIG. 1 with FIG. 1F, forming at least one third conductive layer 50 to cover the at least one first insulative layer 40. In addition, the at least one third conductive layer 50 may be a negative electrode body, and the negative electrode body is a negative electrode (−) of the solid capacitor. For example, the at least one third conductive layer 50 may be a conductive polymer layer, and the conductive polymer layer includes a conductive carbon glue layer or a conductive silver glue layer formed on the outer surface thereof.

Figure 1G:
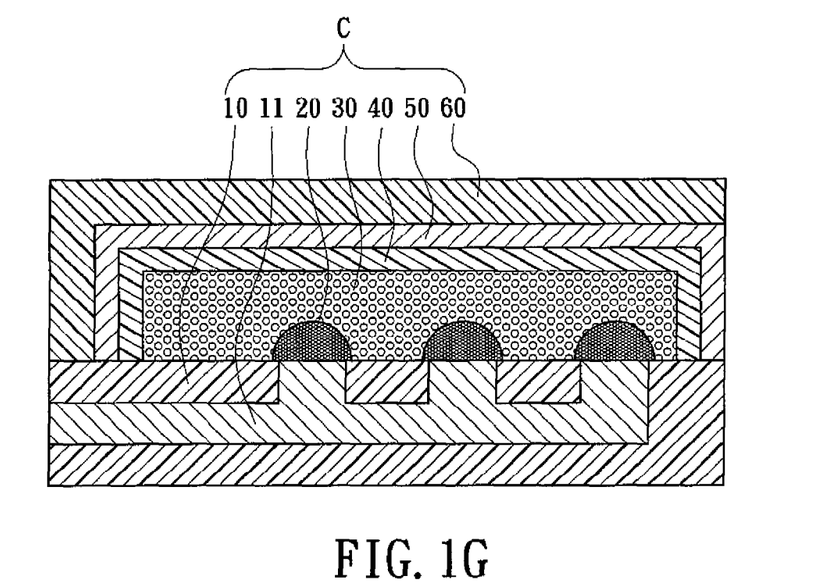

The step S112 is that: cooperating FIG. 1 with FIG. 1G forming at least one second insulative layer 60 to cover one part of the outer surface of the at least one third conductive layer 50, wherein the at least one substrate body 10, the at least one first conductive layer 20, the at least one second conductive layer 30, the at least one first insulative layer 40, the at least one third conductive layer 50, and the at least one second insulative layer 60 are combined to form a core unit C. For example, the at least one second insulative layer 60 may be an insulative polymer layer.

Figure 1H:
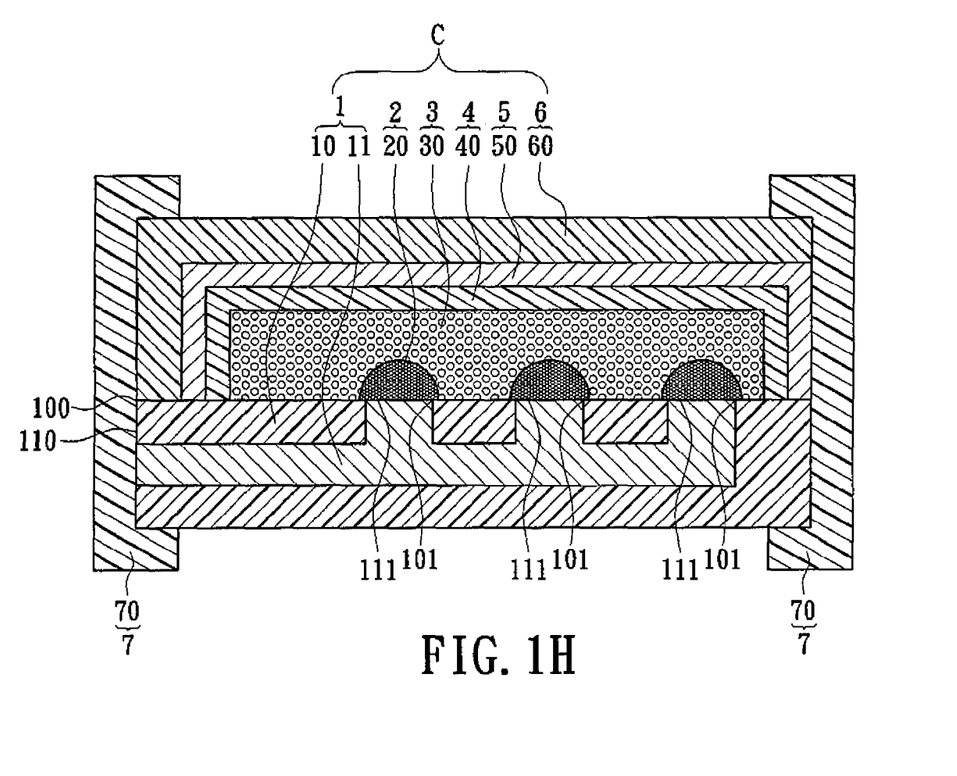

The step S114 is that: cooperating FIG. 1 with FIG. 1H, forming at least two end electrode conductive bodies 70 to respectively cover two opposite end portions of the core unit C, wherein one of the at least two end electrode conductive bodies 70 contacts the at least one lateral conductive area 110, and the other end electrode conductive body 70 contacts the other part of the outer surface of the at least one third conductive layer 50.

Referring to FIG. 1H again, the first embodiment of the instant disclosure provides a solid capacitor having an embedded electrode, comprising: a substrate unit 1, a first conductive unit 2, a second conductive unit 3, a first insulative unit 4, a third conductive unit 5, a second insulative unit 6, and an end electrode unit 7.

The substrate unit 1 includes at least one substrate body 10 and a conductive body 11 embedded into the at least one substrate body 10. The at least one substrate body 10 has at least one lateral opening 100 and a plurality of top openings 101, and the conductive body 11 has at least one lateral conductive area 110 exposed from the at least one lateral opening 100 and a plurality of top conductive areas 111 respectively exposed from the top openings 101. The first conductive unit including a plurality of first conductive layers 20 separated from each other and formed on the at least one substrate body 10 to respectively cover the top conductive areas 111. The second conductive unit 30 includes at least one second conductive layer 30 formed on the at least one substrate body 10 to cover the first conductive layers 20, and the at least one second conductive layer 30 has a porosity rate larger than that of each first conductive layer 20. The first insulative unit 4 includes at least one first insulative layer 40 covering the outer surface of the at least one second conductive layer 30. The third conductive unit 5 includes at least one third conductive layer 50 covering the at least one first insulative layer 40. The second insulative unit 6 includes at least one second insulative layer 60 covering one part of the outer surface of the at least one third conductive layer 50. The substrate unit 1, the first conductive unit 2, the second conductive unit 3, the first insulative unit 4, the third conductive unit 5, and the second insulative unit 6 are combined to form a core unit C. The end electrode unit 7 includes at least two end electrode conductive bodies 70 respectively covering two opposite end portions of the core unit C. In addition, one of the at least two end electrode conductive bodies 70 contacts the at least one lateral conductive area 110, and the other end electrode conductive body 70 contacts the other part of the outer surface of the at least one third conductive layer 50.

Second Embodiment

Figure 2A:
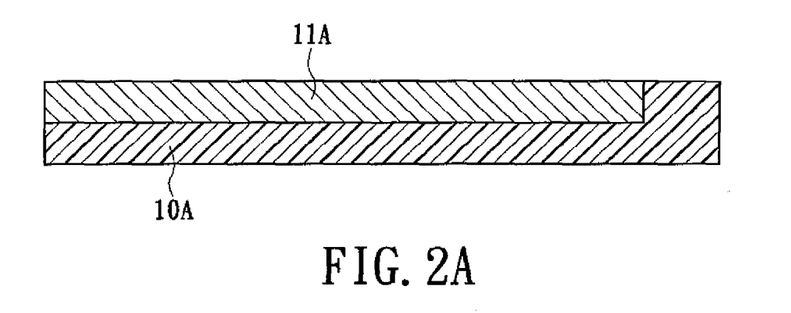
FIGS. 2A to 2C are partial, cross-sectional views of the solid capacitor having an embedded electrode according to the second embodiment of the present invention, at different stages of the manufacturing processes, respectively.
Figure 2B:
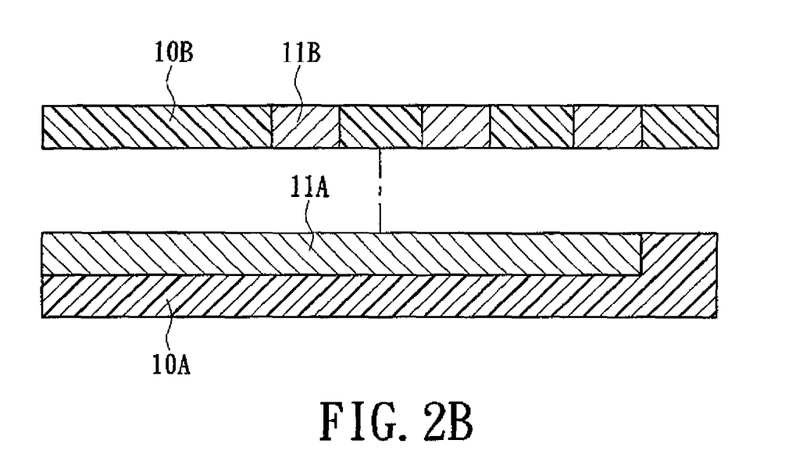
Figure 2C:
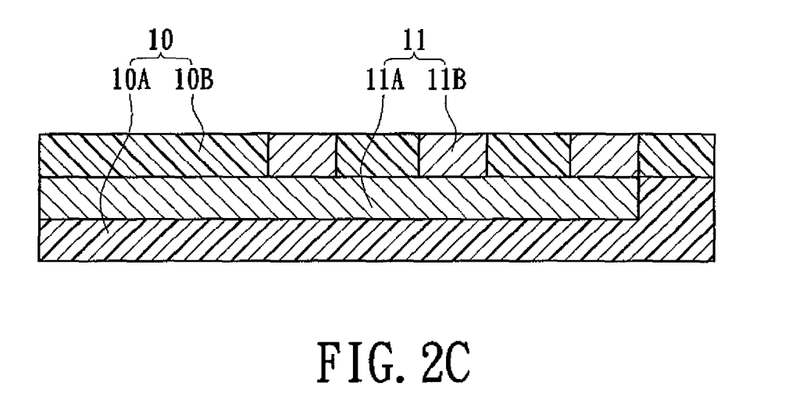

Referring to FIG. 2A to FIG. 2C, where the second embodiment of the instant disclosure provides a method of manufacturing a solid capacitor having an embedded electrode. The difference between the second embodiment and the first embodiment is that: in the second embodiment, the steps from S100 to S102 of the first embodiment can be replaced by the following steps: referring to FIG. 2A, providing a first substrate portion 10A; referring to FIG. 2A, forming a first conductive portion 11A on one part of the top surface of the first substrate portion 10A; and then referring to FIGS. 2B and 2C, placing a second substrate portion 10B having a plurality of second conductive portions 11B on the first substrate portion 10A, wherein the second conductive portions 11B electrically contact the first conductive portion 11A, the first substrate portion 10A and the second substrate portion 10B are combined to form the at least one substrate body 10, and the first conductive portion 11A and the second conductive portions 11B are combined to form the conductive body 11.

Hence, the method of manufacturing the solid capacitor having the embedded electrode of the second embodiment comprises: providing a first substrate portion; forming a first conductive portion on one part of the top surface of the first substrate portion; placing a second substrate portion having a plurality of second conductive portions on the first substrate portion, wherein the second conductive portions electrically contact the first conductive portion, the first substrate portion and the second substrate portion are combined to form the at least one substrate body, and the first conductive portion and the second conductive portions are combined to form the conductive body; forming a plurality of first conductive layers on the substrate body to respectively cover the top conductive areas; forming at least one second conductive layer on the substrate body to cover the first conductive layers, wherein the second conductive layer has a porosity rate larger than that of each first conductive layer; forming at least one first insulative layer to cover the outer surface of the second conductive layer; forming at least one third conductive layer to cover the first insulative layer; forming at least one second insulative layer to cover one part of the outer surface of the third conductive layer, wherein the substrate body, the first conductive layer, the second conductive layer, the first insulative layer, the third conductive layer, and the second insulative layer are combined to form a core unit; forming at least two end electrode conductive bodies to respectively cover two opposite end portions of the core unit, wherein one of the at least two end electrode conductive bodies contacts the lateral conductive area, and the other end electrode conductive body contacts the other part of the outer surface of the third conductive layer.

Third Embodiment

Figure 3A:
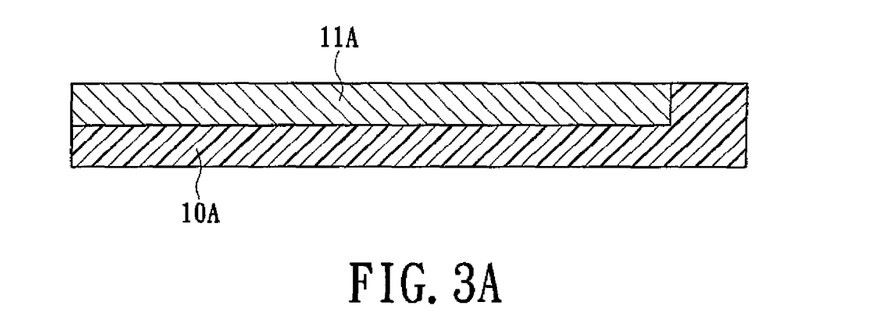
FIGS. 3A to 3C are partial, cross-sectional views of the solid capacitor having an embedded electrode according to the third embodiment of the present invention, at different stages of the manufacturing processes, respectively.
Figure 3B:
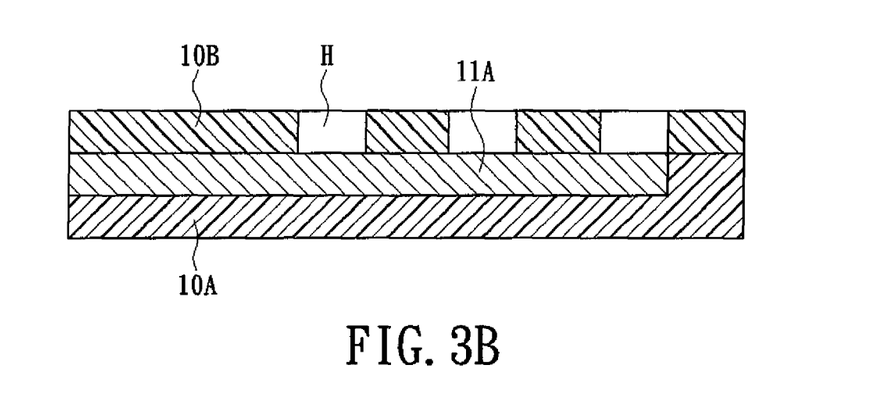
Figure 3C:
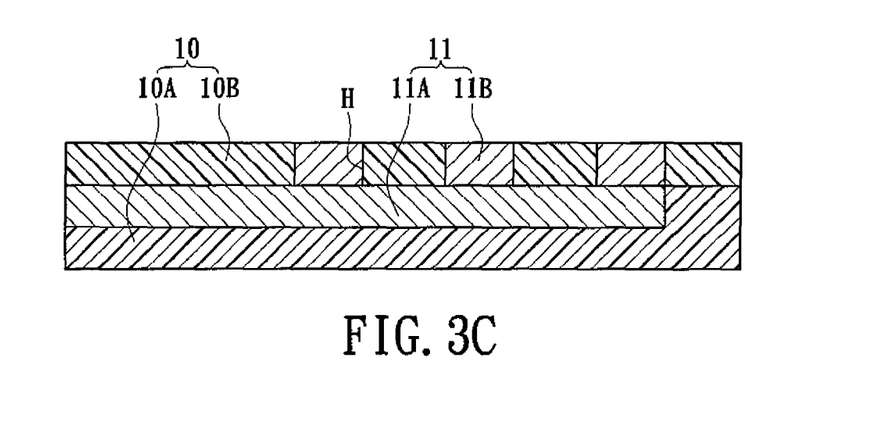

Referring to FIG. 3A to FIG. 3C, where the third embodiment of the instant disclosure provides a method of manufacturing a solid capacitor having an embedded electrode. The difference between the third embodiment and the first embodiment is that: in the third embodiment, the steps from S100 to S102 of the first embodiment can be replaced by the following steps: referring to FIG. 3A, providing a first substrate portion 10A; referring to FIG. 3A, forming a first conductive portion 11A on one part of the top surface of the first substrate portion 10A; referring to FIG. 3B, placing a second substrate portion 10B having a plurality of through holes H on the first substrate portion 10A; and then referring to FIG. 3C, respectively filling a plurality of second conductive portions 11B with the through holes H, wherein the second conductive portions 11B electrically contact the first conductive portion 11A, the first substrate portion 10A and the second substrate portion 10B are combined to form the at least one substrate body 10, and the first conductive portion 11A and the second conductive portions 11B are combined to form the conductive body 11.

Hence, the method of manufacturing the solid capacitor having the embedded electrode of the third embodiment comprises: providing a first substrate portion; forming a first conductive portion on one part of the top surface of the first substrate portion; placing a second substrate portion having a plurality of through holes on the first substrate portion; respectively filling a plurality of second conductive portions with the through holes, wherein the second conductive portions electrically contact the first conductive portion, the first substrate portion and the second substrate portion are combined to form the at least one substrate body, and the first conductive portion and the second conductive portions are combined to form the conductive body; forming a plurality of first conductive layers on the substrate body to respectively cover the top conductive areas; forming at least one second conductive layer on the substrate body to cover the first conductive layers, wherein the second conductive layer has a porosity rate larger than that of each first conductive layer; forming at least one first insulative layer to cover the outer surface of the second conductive layer; forming at least one third conductive layer to cover the first insulative layer; forming at least one second insulative layer to cover one part of the outer surface of the third conductive layer, wherein the substrate body, the first conductive layer, the second conductive layer, the first insulative layer, the third conductive layer, and the second insulative layer are combined to form a core unit; forming at least two end electrode conductive bodies to respectively cover two opposite end portions of the core unit, wherein one of the at least two end electrode conductive bodies contacts the lateral conductive area, and the other end electrode conductive body contacts the other part of the outer surface of the third conductive layer.

Fourth Embodiment

Figure 4:
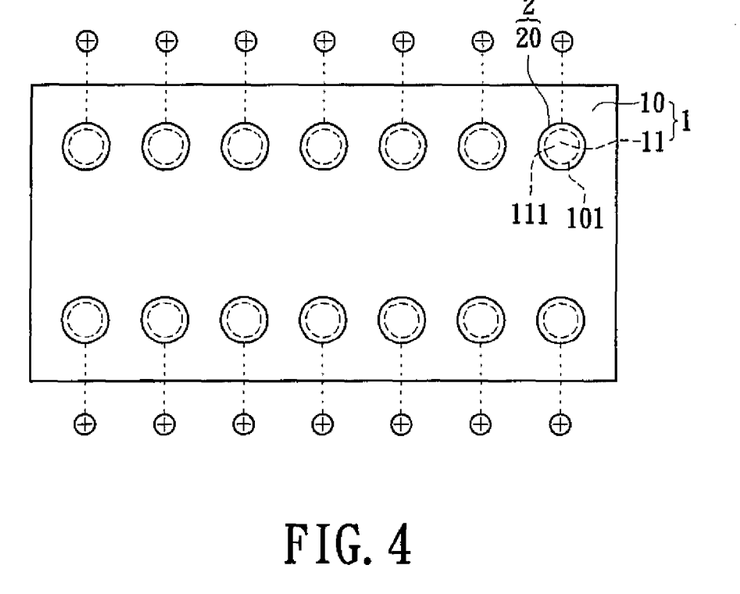
FIG. 4 is a partial, top, schematic view of the solid capacitor having an embedded electrode according to the fourth embodiment of the present invention.

Referring to FIG. 4, where the fourth embodiment of the instant disclosure provides a solid capacitor including a conductive structure having an embedded electrode. The conductive structure comprises a substrate unit 1, a first conductive unit 2, and a second conductive unit (not shown). The substrate unit 1 includes at least one substrate body 10 and a conductive body 11 embedded into the at least one substrate body 10. The at least one substrate body 10 has at least one lateral opening (not shown, but the same to the first embodiment) and a plurality of top openings 101, and the conductive body 11 has at least one lateral conductive area (not shown, but the same to the first embodiment) exposed from the at least one lateral opening (not shown) and a plurality of top conductive areas 111 respectively exposed from the top openings 101. The first conductive unit 2 includes a plurality of first conductive layers 20 (such as many positive electrodes ⊕) separated from each other and formed on the at least one substrate body 10 to respectively cover the top conductive areas 111. The second conductive unit (not shown) includes a plurality of second conductive layers (not shown) separated from each other and formed on the at least one substrate body 10 to respectively cover the first conductive layers 20, and each second conductive layer (not shown) has a porosity rate larger than that of each first conductive layer 20.

Hence, not only the top conductive areas 111 are arranged to form a predetermined shape, but also the first conductive layers 20 are respectively correspond to the second conductive layers 30. In addition, the forth embodiment can further comprises a first insulative unit 4 including a plurality of first insulative layers 40, a third conductive unit 5 including a plurality of third conductive layers 50, a second insulative layer 6 including a plurality of second insulative layers 60, and an end electrode unit 7 including a plurality of end electrode conductive bodies 70. Similar to the first embodiment, the individual first insulative layer 40, the individual third conductive layer 50, the individual second insulative layer 60, and the individual end electrode conductive body 70 can sequentially cover each second conductive layer 30. In other words, the instant disclosure can provide a solid capacitor having a single positive electrode (such as one end electrode conductive body 70 shown in the first embodiment) or a plurality of positive electrodes ⊕ (as shown in the fourth embodiment).

In conclusion, the conductive body is embedded into the substrate body to form an embedded electrode, thus (1) the high resistance electrode path of the instant disclosure can be reduced to decrease the ESR (Equivalent Series Resistance), (2) the productivity and the production yield of the instant disclosure can be increased due to the separation of the positive electrode from the negative electrode during the manufacturing process, and (3) the instant disclosure can provide the solid capacitor having a single positive electrode or a plurality of positive electrodes according to different requirements.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A solid capacitor having an embedded electrode, comprising:
a substrate unit including at least one substrate body and a conductive body embedded into the at least one substrate body, wherein the at least one substrate body has at least one lateral opening and a plurality of top openings, and the conductive body has at least one lateral conductive area exposed from the at least one lateral opening and a plurality of top conductive areas respectively exposed from the top openings;
a first conductive unit including a plurality of first conductive layers separated from each other and formed on the at least one substrate body to respectively cover the top conductive areas;
a second conductive unit including at least one second conductive layer formed on the at least one substrate body to cover the first conductive layers, wherein the at least one second conductive layer has a porosity rate larger than that of each first conductive layer;
a first insulative unit including at least one first insulative layer covering the outer surface of the at least one second conductive layer;
a third conductive unit including at least one third conductive layer covering the at least one first insulative layer;

a second insulative unit including at least one second insulative layer covering one part of the outer surface of the at least one third conductive layer, wherein the substrate unit, the first conductive unit, the second conductive unit, the first insulative unit, the third conductive unit, and the second insulative unit are combined to form a core unit; and an end electrode unit including at least two end electrode conductive bodies respectively covering two opposite end portions of the core unit, wherein one of the at least two end electrode conductive bodies contacts the at least one lateral conductive area, and the other end electrode conductive body contacts the other part of the outer surface of the at least one third conductive layer.

2. The solid capacitor of claim 1, wherein the at least one substrate body is a ceramic substrate, the conductive body is a tantalum body or a positive electrode body having a conductivity larger than that of the tantalum body, the at least one first insulative layer is a $Ta_2O_5$ metal oxide layer, and the at least one second insulative layer is an insulative polymer layer.

3. The solid capacitor of claim 1, wherein each first conductive layer and the at least one second conductive layer are sintered Ta conductive bodies, and the at least one third conductive layer is a negative electrode body.

4. The solid capacitor of claim 1, wherein the at least one third conductive layer is a conductive polymer layer, and the conductive polymer layer includes a conductive carbon glue layer or a conductive silver glue layer formed on the outer surface thereof.

5. The solid capacitor of claim 1, wherein the top conductive areas are arranged to form a predetermined shape, and each first conductive layer has a porosity rate between 0.1% and 5%.

6. A method of manufacturing a solid capacitor having an embedded electrode, comprising the steps of:
   providing a substrate unit including at least one substrate body and a conductive body embedded into the at least one substrate body, wherein the at least one substrate body has at least one lateral opening and a plurality of top openings, and the conductive body has at least one lateral conductive area exposed from the at least one lateral opening and a plurality of top conductive areas respectively exposed from the top openings;
   forming a plurality of first conductive layers on the at least one substrate body to respectively cover the top conductive areas;
   forming at least one second conductive layer on the at least one substrate body to cover the first conductive layers, wherein the at least one second conductive layer has a porosity rate larger than that of each first conductive layer;
   forming at least one first insulative layer to cover the outer surface of the at least one second conductive layer;
   forming at least one third conductive layer to cover the at least one first insulative layer;
   forming at least one second insulative layer to cover one part of the outer surface of the at least one third conductive layer, wherein the at least one substrate body, the at least one first conductive layer, the at least one second conductive layer, the at least one first insulative layer, the at least one third conductive layer, and the at least one second insulative layer are combined to form a core unit; and
   forming at least two end electrode conductive bodies to respectively cover two opposite end portions of the core unit, wherein one of the at least two end electrode conductive bodies contacts the at least one lateral conductive area, and the other end electrode conductive body contacts the other part of the outer surface of the at least one third conductive layer.

7. The method of claim 6, wherein the step of providing the substrate unit further comprising:
   forming a receiving space in the at least one substrate body; and
   filling the receiving space with the conductive body.

8. The method of claim 6, wherein the step of providing the substrate unit further comprising:
   providing a first substrate portion;
   forming a first conductive portion on one part of the top surface of the first substrate portion; and
   placing a second substrate portion having a plurality of second conductive portions on the first substrate portion, wherein the second conductive portions electrically contact the first conductive portion, the first substrate portion and the second substrate portion are combined to form the at least one substrate body, and the first conductive portion and the second conductive portions are combined to form the conductive body.

9. The method of claim 6, wherein the step of providing the substrate unit further comprising:
   providing a first substrate portion;
   forming a first conductive portion on one part of the top surface of the first substrate portion;
   placing a second substrate portion having a plurality of through holes on the first substrate portion; and
   respectively filling a plurality of second conductive portions with the through holes, wherein the second conductive portions electrically contact the first conductive portion, the first substrate portion and the second substrate portion are combined to form the at least one substrate body, and the first conductive portion and the second conductive portions are combined to form the conductive body.

10. The method of claim 6, wherein the at least one substrate body is a ceramic substrate, the conductive body is a tantalum body or a positive electrode body having a conductivity larger than that of the tantalum body, the at least one first insulative layer is a $Ta_2O_5$ metal oxide layer, and the at least one second insulative layer is an insulative polymer layer.

11. The method of claim 6, wherein each first conductive layer and the at least one second conductive layer are sintered Ta conductive bodies, and the at least one third conductive layer is a negative electrode body.

12. The method of claim 6, wherein the at least one third conductive layer is a conductive polymer layer, and the conductive polymer layer includes a conductive carbon glue layer or a conductive silver glue layer formed on the outer surface thereof.

13. The method of claim 6, wherein the top conductive areas are arranged to form a predetermined shape, and each first conductive layer has a porosity rate between 0.1% and 5%.

14. A conductive structure having an embedded electrode, comprising:
   a substrate unit including at least one substrate body and a conductive body embedded into the at least one substrate body, wherein the at least one substrate body has at least one lateral opening and a plurality of top openings, and the conductive body has at least one lateral conductive area exposed from the at least one lateral opening and a plurality of top conductive areas respectively exposed from the top openings;

a first conductive unit including a plurality of first conductive layers separated from each other and formed on the at least one substrate body to respectively cover the top conductive areas; and a second conductive unit including a plurality of second conductive layers separated from each other and formed on the at least one substrate body to respectively cover the first conductive layers, wherein each second conductive layer has a porosity rate larger than that of each first conductive layer.

15. The conductive structure of claim 14, wherein the at least one substrate body is a ceramic substrate, the conductive body is a tantalum body or a positive electrode body having a conductivity larger than that of the tantalum body, and each first conductive layer and the at least one second conductive layer are sintered Ta conductive bodies.

16. The conductive structure of claim 14, wherein the top conductive areas are arranged to form a predetermined shape, and each first conductive layer has a porosity rate between 0.1% and 5%.

* * * * *